(12) United States Patent
Lee et al.

(10) Patent No.: US 7,956,127 B2
(45) Date of Patent: Jun. 7, 2011

(54) POLYCARBONATE RESIN COMPOSITION AND PLASTIC ARTICLE

(75) Inventors: Byung Choon Lee, Seoul (KR); Tae Uk Kim, Suwon-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 11/958,486

(22) Filed: Dec. 18, 2007

(65) Prior Publication Data

US 2008/0161494 A1    Jul. 3, 2008

(30) Foreign Application Priority Data

Dec. 29, 2006    (KR) ........................ 10-2006-0138341

(51) Int. Cl.
*C08L 51/00*      (2006.01)
*C08L 69/00*      (2006.01)

(52) U.S. Cl. ............ 525/67; 525/902; 525/241; 525/85; 525/92 E; 523/201

(58) Field of Classification Search ............. 525/67; 526/902, 241, 242, 85, 92 E; 523/201
See application file for complete search history.

(56) References Cited

U.S. PATENT DOCUMENTS

| | | | |
|---|---|---|---|
| 4,997,883 A | 3/1991 | Fischer et al. | |
| 5,239,001 A * | 8/1993 | Fischer et al. | 525/133 |
| 2002/0151624 A1 * | 10/2002 | Kobayashi | 524/115 |
| 2004/0013882 A1 * | 1/2004 | Gorny et al. | 428/412 |
| 2005/0159533 A1 * | 7/2005 | Nabeshima et al. | 524/494 |

FOREIGN PATENT DOCUMENTS

| | | | |
|---|---|---|---|
| JP | 10 017762 A | | 1/1998 |
| JP | 2002348457 A | * | 12/2002 |
| WO | 2007/140101 A | | 12/2007 |

OTHER PUBLICATIONS

Machine Translation of JP 10-017762.*
Derwent Abstract of JP 2002348457 A (2003).*
Full English Translation of JP-10-017762 (2011).*
Machine Translation of JP-10-017762 (2010).*
European Search Report in counterpart European Application No. 07024808, dated Mar. 18, 2008.

* cited by examiner

*Primary Examiner* — Vasu Jagannathan
*Assistant Examiner* — Mark S Kaucher
(74) *Attorney, Agent, or Firm* — Summa, Additon & Ashe, P.A.

(57) ABSTRACT

Disclosed herein are a polycarbonate resin composition and a plastic article produced from the resin composition. The polycarbonate resin composition includes about 85 to about 99 parts by weight of a polycarbonate resin and about 1 to about 15 parts by weight of a core-shell graft copolymer, wherein the core-shell graft copolymer has a core-shell structure in which a vinyl monomer including methyl methacrylate and phenyl methacrylate is grafted onto a rubber.

14 Claims, No Drawings

POLYCARBONATE RESIN COMPOSITION AND PLASTIC ARTICLE

CROSS-REFERENCE TO RELATED APPLICATION

This non-provisional application claims priority under 35 USC Section 119 from Korean Patent Application No. 10-2006-0138341, filed on Dec. 29, 2006, which is hereby incorporated by reference in its entirety.

FIELD OF THE INVENTION

The present invention relates to a polycarbonate resin composition and a plastic article.

BACKGROUND OF THE INVENTION

Thermoplastic polycarbonate resins exhibit superior transparency, heat stability, impact resistance, self-extinguishability and dimensional stability, and thus are widely utilized in a variety of applications including electric and electronic products, automobile components, and the like. In addition, due to excellent transparency and good impact resistance, thermoplastic polycarbonate resins are used for lenses, glass windows, and the like.

However, because of its structural characteristics, such a thermoplastic polycarbonate resin undergoes transition in failure mode from ductile fracture behaviors to brittle fracture behaviors, under the conditions of, e.g., about 5 to 7 mm or more thicknesses, or predetermined temperatures or less (i.e., about −20° C. in the case of a 1.6 mm thickness), thus leading to a deterioration in impact resistance.

A variety of attempts have been made to solve the drawbacks of thermoplastic polycarbonate resins. For example, a core-shell graft copolymer can be included in a polycarbonate resin composition to improve the impact resistance of the polycarbonate resin composition.

However, this method is disadvantageous because it can deteriorate the transparency of the thermoplastic polycarbonate resin, thereby making it difficult to stain the resin with high-chroma colors.

SUMMARY OF THE INVENTION

In accordance with one aspect of the present invention, there is provided a polycarbonate resin composition comprising: about 85 to about 99 parts by weight of a polycarbonate resin; and about 1 to about 15 parts by weight of a core-shell graft copolymer, wherein the core-shell graft copolymer has a core-shell structure in which a vinyl monomer including methyl methacrylate and phenyl methacrylate is grafted onto a rubber. The polycarbonate resin composition of the invention is capable of preventing deterioration in the transparency of the polycarbonate resin yet is also capable of increasing improvement in the impact resistance thereof.

In accordance with another aspect of the present invention, there is provided a plastic article produced from the polycarbonate resin composition.

Details of other aspects and exemplary embodiments of the present invention are encompassed in the following detailed description.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In one aspect, the present invention is directed to a polycarbonate resin composition comprising about 85 to about 99 parts by weight of a polycarbonate resin and about 1 to about 15 parts by weight of a core-shell graft copolymer, wherein the core-shell graft copolymer has a core-shell structure in which a vinyl monomer including methyl methacrylate and phenyl methacrylate is grafted onto a rubber.

The polycarbonate resin composition of the invention comprises a core-shell graft copolymer which is obtained from vinyl monomers including specific monomers, in addition to a polycarbonate resin as a main ingredient. The core-shell graft copolymer has a refractive index and a particle size in a desirable range, and accordingly it is capable of preventing deterioration in the transparency of the thermoplastic polycarbonate resin. The addition of the core-shell graft copolymer to the polycarbonate resin composition can also increase the improvement in impact resistance of the thermoplastic polycarbonate resin. That is, the polycarbonate resin composition comprises a desired amount of the core-shell graft copolymer, together with the polycarbonate resin, thereby preventing deterioration in the transparency of the thermoplastic polycarbonate resin and increasing the improvement in impact resistance thereof.

A more detailed explanation of respective ingredients of the polycarbonate resin composition will be given below.

The polycarbonate resin composition comprises a polycarbonate resin.

The polycarbonate resin may be prepared by methods conventionally used in the art. For example, the polycarbonate resin may be prepared by reacting dihydric phenol with a phosgene in the presence of an end capping agent and a catalyst. Alternatively, the polycarbonate resin may be prepared by performing an ester-exchange reaction of dihydric phenol in the presence of a carbonate precursor such as diphenylcarbonate.

An exemplary dihydric phenol that can be used to prepare the polycarbonate resin may be bisphenol, for example, 2,2-bis(4-hydroxyphenyl)propane(bisphenol A). The bisphenol A may be partially or wholly replaced by another dihydric phenol. Examples of other suitable dihydric phenols include hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether and halogenized bisphenol such as 2,2-bis(3,5-dibromo-4-hydroxyphenyl)propane, and the like, and mixtures thereof.

The kinds of dihydric phenol useful for the preparation of the polycarbonate resin are not limited to the above examples. Any dihydric phenol may be used to prepare the polycarbonate resin without particular limitation.

The polycarbonate resin may be a homopolymer obtained from one kind of dihydric phenol, a copolymer obtained from two or more kinds of dihydric phenols, or a mixture thereof.

Generally, the polycarbonate resin may be a linear polycarbonate resin, a branched polycarbonate resin, a polyester-carbonate copolymer resin, and the like, as well as mixtures thereof. There is no particular limitation on the kind of the polycarbonate resin contained in the polycarbonate resin composition. The polycarbonate resin may be any of the types mentioned above.

The linear polycarbonate resin may be a bisphenol A-polycarbonate resin. The branched polycarbonate may be prepared by reacting a multifunctional aromatic compound such as trimellitic anhydride or trimellitic acid with dihydroxyphenol in the presence of a carbonate precursor. The polyester carbonate copolymer may be prepared by reacting difunctional carboxylic acid with dihydric phenol in the presence of a carbonate precursor. Further, any polycarbonate resin (e.g., a linear polycarbonate resin, a branched polycarbonate resin, or a polyester-carbonate copolymer resin) may used without particular limitation so long as it is conventionally used in the art.

The polycarbonate resin composition of the present invention can include polycarbonate resin in an amount of about 85 to about 99 parts by weight. This range of polycarbonate resin content can contribute to the prevention of deterioration of transparency of the thermoplastic polycarbonate resin, which results from the addition of the core-shell graft copolymer, and can increase the improvement in the impact resistance thereof.

Further, the polycarbonate resin composition comprises a core-shell graft copolymer. The core-shell graft copolymer has a core-shell structure in which a vinyl monomer including methyl methacrylate and phenyl methacrylate is grafted onto a rubber.

The core-shell graft copolymer is generally prepared by polymerizing rubber monomers and then grafting given vinyl monomers onto a product (i.e., a rubber) obtained from the polymerization of the rubber monomers. That is to say, the core-shell graft copolymer has a core-shell structure in which the vinyl monomers are grafted on the rubber core to form a hard shell.

The polycarbonate resin composition according to the present invention comprises a core-shell graft copolymer prepared by grafting specific monomers, i.e., vinyl monomers including methyl methacrylate and phenyl methacrylate, onto a rubber.

The refractive index and particle size of the core-shell graft copolymer are in a desired range. Accordingly, including the core-shell graft copolymer in the thermoplastic polycarbonate resin composition can reduce deterioration in transparency of the thermoplastic polycarbonate resin and can also increase the improvement in impact resistance thereof.

The rubber monomer that can be used in preparation of the core-shell graft copolymer is selected from a $C_4$-$C_6$ diene rubber monomer, a styrene rubber monomer and a mixture thereof. Further, any rubber monomer may used without particular limitation so long as it is conventionally used in the art to prepare core-shell graft copolymers.

The amount of the rubber contained in the core-shell graft copolymer may be about 40 to about 90 parts by weight, based on 100 parts by weight of the core-shell graft copolymer. When the rubber content is less than about 40 parts by weight, based on 100 parts by weight of the core-shell graft copolymer, impact resistance of the thermoplastic polycarbonate resin cannot be improved to a desired level.

The vinyl monomer that can be used in preparation of the core-shell graft copolymer may further include other vinyl monomers, in addition to the specific monomers, i.e., methyl methacrylate and phenyl methacrylate. For example, the vinyl monomer may further include an acrylate monomer selected from the group consisting of ethyl acrylate, n-propyl acrylate, n-butyl acrylate, 2-ethylhexyl acrylate, hexyl methacrylate, 2-ethylhexyl methacrylate, and the like, and mixtures thereof. In addition, the vinyl monomer may further include at least one selected from the group consisting of styrene, α-methyl styrene, halogen-substituted styrene, $C_1$-$C_8$ alkyl-substituted styrene, $C_1$-$C_8$ methacrylic acid alkyl ester, $C_1$-$C_8$ acrylic acid alkyl ester, acrylonitrile, methacrylonitrile, and the like, and mixtures thereof.

The vinyl monomer including methyl methacrylate and phenyl methacrylate may be present in an amount of about 10 to about 60 parts by weight in the core-shell graft copolymer, based on a total of 100 parts by weight of the core-shell graft copolymer. The methyl methacrylate and phenyl methacrylate may be present in an amount of about 5 to about 50 parts by weight in the vinyl monomer, based on a total of 100 parts by weight of the vinyl monomer. When the total content of the methyl methacrylate and phenyl methacrylate is less than about 5 parts by weight, the core-shell graft copolymer can have an undesirable refractive index, and the transparency of the thermoplastic polycarbonate resin cannot be thus improved to a desired level. Meanwhile, when the content of the methyl methacrylate and phenyl methacrylate exceeds about 50 parts by weight, the impact resistance of the thermoplastic polycarbonate resin cannot be ensured to be at a desired level.

The content ratio (w/w) of the methyl methacrylate and the phenyl methacrylate in the vinyl monomer can be in a range of about 5:95 to about 70:30, for example in a range of about 5:95 to about 50:50, to increase the improvement in transparency and colorability.

In accordance with the method conventionally used in the art, the core-shell graft copolymer may be prepared by injecting a polymerization initiator into the polymerization product (i.e., rubber-particle latex) of the rubber monomers and introducing the vinyl monomer mentioned above thereto under the conditions of a constant rate and a constant temperature to graft the vinyl monomer into the polymerization product.

The thermoplastic polycarbonate resin composition can include the core-shell graft copolymer in an amount of about 1 to about 15 parts by weight. When the content of the core-shell graft copolymer is less than about 1 part by weight, the impact resistance of the thermoplastic polycarbonate resin cannot be thus improved to a desired level. Meanwhile, when the content of the core-shell graft copolymer exceeds about 15 parts by weight, the mechanical properties (e.g., tensile strength, flexural strength and flexural modulus), transparency or colorability of the thermoplastic polycarbonate resin may be deteriorated.

The thermoplastic resin composition may further comprise at least one additive suitable for its intended use. Examples of the additive can include a flame retardant, a lubricant, an antimicrobial agent, a release agent, a nucleating agent, a plasticizer, a heat stabilizer, an antioxidant, a light stabilizer, a compatibilizer, a pigment, a dye, and other inorganic additives, and mixtures thereof. The thermoplastic polycarbonate resin can include the additive in an amount of about 60 parts or less by weight, based on a total of 100 parts by weight of the thermoplastic resin composition.

A polycarbonate resin and a plastic article prepared from the polycarbonate resin may be prepared by methods conventionally used in the art. For example, a polycarbonate resin can be prepared by mixing the respective ingredients with other additives to prepare a thermoplastic polycarbonate composition and melt-extruding the resin composition in an extruder.

In another aspect, the present invention is directed to a plastic article produced from the polycarbonate resin composition. The plastic article may comprise a resin base including polycarbonate in the form of a resin matrix and a core-shell graft copolymer, wherein the core-shell graft copolymer is dispersed in the resin base and has a core-shell structure in which a vinyl monomer including methyl methacrylate and phenyl methacrylate is grafted onto a rubber.

Since the plastic article comprises the resin base including polycarbonate in the form of a resin matrix and the core-shell graft copolymer dispersed in the resin base, it is capable of avoiding deterioration in transparency and exhibiting more improved impact resistance. Accordingly, the plastic article exhibits superior colorability, and thus is capable of being widely utilized in a variety of applications including electric and electronic components, automobile components, glass windows, and the like. In particular, the plastic article may be used for a coating-free exterior material of electronic products which requires high chroma.

The present invention will be better understood from the following examples. However, these examples are given for illustrative purposes and are not to be construed as limiting the scope of the invention.

The following is a more detailed description of ingredients, i.e., (A) polycarbonate resin and (B) core-shell graft copolymer, of the polycarbonate resin composition used in the Examples and Comparative Examples:.

(A) Polycarbonate Resin

PANLITE L-1250 WP (available from TEIJIN Limited, Japan) is used as a linear bisphenol-A polycarbonate resin having a weight average molecular weight of 25,000 g/mol.

(B) Core-Shell Graft Copolymer

A polymer product (available from Mitsubishi Rayon Corp.) is used in which methyl methacrylate and phenyl methacrylate monomers are graft-polymerized onto a butadiene-styrene rubber.

(C) Core-Shell Graft Copolymer (Comparative Example)

C-223A (available from Mitsubishi Rayon Corp.) is used in the Comparative Example in which a methyl methacrylate monomer is graft-polymerized onto a butadiene-styrene rubber.

EXAMPLES 1 & 2 AND COMPARATIVE EXAMPLES 1 TO 3

The respective ingredients mentioned above are mixed in accordance with the composition as set forth in Table 1 to prepare a polycarbonate resin composition, and the composition is then extruded in a twin-screw extruder ($\phi$=45 mm) to prepare a polycarbonate resin in a pellet form. The pellet thus obtained is dried at 110° C. for 3 hours or more and introduced into a 10 oz injection machine at an injection temperature of 260 to 330° C. and a molding temperature of 60 to 100° C., to prepare test specimens for measurement of physical properties.

TABLE 1

|  | Example No. | | Comparative Example No. | | |
| --- | --- | --- | --- | --- | --- |
|  | 1 | 2 | 1 | 2 | 3 |
| (A) Polycarbonate resin | 97 | 95 | 100 | 97 | 85 |
| (B) Core-shell graft copolymer | 3 | 10 | — | — | 20 |
| (C) Core-shell graft copolymer (C-223A) | — | — | — | 3 | — |

The measurement of the physical properties of the test specimen is carried out in accordance with the following methods.

First, the notched IZOD impact resistance (⅛" & ¼") of each test specimens is measured in accordance with ASTM D256, which is an American Standard Test Method (ASTM) used to measure an IZOD impact strength of plastics (impact resistance evaluation).

The haze of the specimens is measured using a Gretag MacBeth Color-Eye 7000A instrument (evaluation of transparency and colorability).

The physical property values thus measured are shown in Table 2 below.

TABLE 2

|  | Example No. | | Comparative Example No. | | |
| --- | --- | --- | --- | --- | --- |
|  | 1 | 2 | 1 | 2 | 3 |
| ⅛" IZOD impact resistance (kg · cm/cm) | 77 | 75 | 73 | 74 | 70 |
| ¼" IZOD impact resistance (kg · cm/cm) | 46 | 52 | 6 | 49 | 66 |
| Haze | 29 | 45 | 7 | 92 | 82 |

Table 2 illustrates that the samples of Examples 1 and 2 comprising the polycarbonate resin and the core-shell graft copolymer (B) showed little deterioration in transparency and colorability as a result of the addition of the core-shell graft copolymer, and exhibited more improved impact resistance, as compared to the sample of Comparative Example 2 comprising the core-shell graft copolymer (C).

In addition, the samples of Examples 1 and 2 exhibited more improved impact resistance, as compared to the sample of comparative Example 1, which did not include a core-shell graft copolymer.

As can be seen from Table 2, the samples of Examples 1 and 2 comprising the two ingredients in a specific content range exhibited more improved impact resistance, transparency and colorability, as compared to the sample of Comparative Example 3 comprising the core-shell graft copolymer (B) in an amount exceeding 15 parts by weight, which is outside of the content range as defined above.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising:
   about 85 to about 99 parts by weight of a polycarbonate resin; and
   about 1 to about 15 parts by weight of a core-shell graft copolymer,
   wherein the core-shell graft copolymer has a core-shell structure in which vinyl monomers, including methyl methacrylate and phenyl methacrylate, are grafted onto a rubber and wherein the rubber includes a $C_4$-$C_6$ diene rubber monomer, a styrene rubber monomer, or a mixture thereof, and
   wherein the vinyl monomers comprise said methyl methacrylate and phenyl methacrylate in an amount of about 5 to about 50 parts by weight, based on 100 parts by weight of the vinyl monomers.

2. The polycarbonate resin composition according to claim 1, wherein the polycarbonate resin is selected from the group consisting of linear polycarbonate resins, branched polycarbonate resins, polyester-carbonate copolymer resins, and mixtures thereof.

3. The polycarbonate resin composition according to claim 2, wherein the linear polycarbonate resin includes a bisphenol A polycarbonate resin.

4. The polycarbonate resin composition according to claim 1, wherein the core-shell graft copolymer comprises said rubber in an amount of about 40 to about 90 parts by weight, based on 100 parts by weight of the core-shell graft copolymer.

5. The polycarbonate resin composition according to claim 1, wherein the weight ratio of the methyl methacrylate and the phenyl methacrylate contained in the vinyl monomers is in a range of about 5:95 to about 70:30.

6. The polycarbonate resin composition according to claim 1, wherein the vinyl monomers include at least one additional vinyl monomer selected from the group consisting of ethyl acrylate, n-propyl acrylate, n-butyl acrylate, 2-ethylhexyl acrylate, hexyl methacrylate, 2-ethylhexyl methacrylate, styrene, α-methyl styrene, halogen-substituted styrene, $C_1$-$C_8$ alkyl-substituted styrene, $C_1$-$C_8$ methacrylic acid alkyl ester, $C_1$-$C_8$ acrylic acid alkyl ester, acrylonitrile, methacrylonitrile, and mixtures thereof.

7. A plastic article produced from the polycarbonate resin composition according to claim 1.

8. A plastic article comprising:
A resin base comprising polycarbonate in the form of a resin matrix; and
a core-shell graft copolymer,
wherein the core-shell graft copolymer is dispersed in the resin base and has a core-shell structure in which vinyl monomers, including methyl methacrylate and phenyl methacrylate, are grafted onto a rubber and wherein the rubber includes a $C_4$-$C_6$ diene rubber monomer, a styrene rubber monomer, or a mixture thereof, and
wherein the vinyl monomers comprise said methyl methacrylate and phenyl methacrylate in an amount of about 5 to about 50 parts by weight, based on 100 parts by weight of the vinyl monomers.

9. The article according to claim 8, wherein said article is an electric component, an electronic component, an automobile component, or a glass window.

10. The article according to claim 8, wherein said article is a coating-free exterior material for an electronic product requiring high chroma.

11. The polycarbonate resin composition according to claim 1, wherein the rubber is a butadiene rubber.

12. The polycarbonate resin composition according to claim 1, wherein the rubber is a butadiene-styrene rubber.

13. The plastic article according to claim 8, wherein the rubber is a butadiene rubber.

14. The plastic article according to claim 8, wherein the rubber is a butadiene-styrene rubber.

* * * * *